(12) United States Patent
Murata

(10) Patent No.: US 8,279,273 B2
(45) Date of Patent: *Oct. 2, 2012

(54) ENDOSCOPE APPARATUS

(75) Inventor: Masanao Murata, Tokyo (JP)

(73) Assignee: Olympus Corporation (JP)

( * ) Notice: Subject to any disclaimer, the term of this patent is extended or adjusted under 35 U.S.C. 154(b) by 1449 days.

This patent is subject to a terminal disclaimer.

(21) Appl. No.: 11/626,895

(22) Filed: Jan. 25, 2007

(65) Prior Publication Data

US 2007/0177010 A1    Aug. 2, 2007

(30) Foreign Application Priority Data

Jan. 27, 2006    (JP) .................................. 2006-019146

(51) Int. Cl.
*H02H 3/22* (2006.01)
*A61B 1/04* (2006.01)

(52) U.S. Cl. ............................ 348/65; 600/110; 600/112

(58) Field of Classification Search ..................... 348/65
See application file for complete search history.

(56) References Cited

U.S. PATENT DOCUMENTS

| 5,225,958 | A | * | 7/1993 | Nakamura | 361/55 |
| 5,365,940 | A | * | 11/1994 | Teves | 600/549 |
| 5,374,953 | A | | 12/1994 | Sasaki et al. | |
| 6,796,939 | B1 | * | 9/2004 | Hirata et al. | 600/179 |
| 7,272,194 | B1 | * | 9/2007 | Mahmoud | 375/286 |
| 7,312,716 | B2 | * | 12/2007 | Kothari et al. | 340/635 |
| 2003/0109937 | A1 | * | 6/2003 | Zielinski et al. | 700/1 |
| 2003/0112609 | A1 | * | 6/2003 | Takami | 361/748 |
| 2003/0122926 | A1 | * | 7/2003 | Kumei et al. | 348/65 |
| 2003/0173081 | A1 | | 9/2003 | Vinegar et al. | |
| 2005/0272975 | A1 | * | 12/2005 | McWeeney et al. | 600/113 |
| 2008/0294105 | A1 | * | 11/2008 | Gono et al. | 604/109 |

FOREIGN PATENT DOCUMENTS

| EP | 0 071 724 A1 | 2/1983 |
| JP | 56-162841 | 12/1981 |
| JP | 57-211111 | 12/1982 |
| JP | 57-212701 | 12/1982 |
| JP | 58-176530 | 11/1983 |
| JP | 59-144741 | 9/1984 |
| JP | 59-179434 | 11/1984 |
| JP | 63-39683 | 3/1988 |
| JP | 05-034602 | 2/1993 |

(Continued)

OTHER PUBLICATIONS

Japanese Office Action for corresponding Japanese Application No. 2006-019146 dated Feb. 10, 2011 (with English translation).

(Continued)

*Primary Examiner* — Patrice Winder
*Assistant Examiner* — Tauqir Hussain
(74) *Attorney, Agent, or Firm* — Ostrolenk Faber LLP

(57) ABSTRACT

An endoscope apparatus, includes: an explosion-proof unit that has an image pickup device that outputs photographed video images as video image signals; and an A/D converter that converts the video image signals into digitalized image signals; a control unit that controls the explosion-proof unit; and an energy limiting circuit that is provided at the control unit and that limits electrical energy of digital signals to satisfy intrinsic safety when sending and receiving of the digital signals, wherein the explosion-proof unit is connected to the control unit via the energy limiting circuit with a signal line.

13 Claims, 7 Drawing Sheets

FOREIGN PATENT DOCUMENTS

| | | |
|---|---|---|
| JP | 05-509400 | 12/1993 |
| JP | 06-100097 | 4/1994 |
| JP | 06-335450 | 12/1994 |
| JP | 07-326992 | 12/1995 |
| JP | 08-293892 | 11/1996 |
| JP | 09-065441 | 3/1997 |
| JP | 2001-75020 | 3/2001 |
| JP | 2001-075021 | 3/2001 |
| JP | 2001-275954 | 10/2001 |
| JP | 2004-070709 | 3/2004 |
| JP | 2005-165815 | 6/2005 |
| JP | 2005-311535 | 11/2005 |
| WO | WO 91/18236 | 11/1991 |
| WO | 03/005391 | 1/2003 |
| WO | WO 03/005319 | 1/2003 |

OTHER PUBLICATIONS

Notice of Allowance issued by Japanese Patent Office on May 17, 2011 in connection with corresponding Japanese application No. 2006-019146 and English translation thereof.

Office Action issued by Japanese Patent Office on Jul. 12, 2011 in connection with corresponding Japanese application No. 2005-355359 and English translation thereof.

Notice of Allowance issued by U.S. Patent Office on Jan. 31, 2012 in connection with corresponding U.S. Appl. No. 11/567,885.

Office Action issued by U.S. Patent Office on Jun. 10, 2011 in connection with corresponding U.S. Appl. No. 11/567,885.

Office Action issued by U.S. Patent Office on Dec. 16, 2011 in connection with corresponding U.S. Appl. No. 11/567,885.

Office Action issued by U.S. Patent Office on May 5, 2010 in connection with corresponding U.S. Appl. No. 11/567,885.

Office Action issued by U.S. Patent Office on Apr. 9, 2010 in connection with corresponding U.S. Appl. No. 11/567,885.

Office Action issued by U.S. Patent Office on Dec. 21, 2009 in connection with corresponding U.S. Appl. No. 11/567,885.

Office Action issued by U.S. Patent Office on Jul. 8, 2009 in connection with corresponding U.S. Appl. No. 11/567,885.

Office Action issued by U.S. Patent Office on Dec. 31, 2008 in connection with corresponding U.S. Appl. No. 11/567,885.

Office Action issued by U.S. Patent Office on Jun. 20, 2008 in connection with corresponding U.S. Appl. No. 11/567,885.

Office Action issued by U.S. Patent Office on Dec. 7, 2007 in connection with corresponding U.S. Appl. No. 11/567,885.

* cited by examiner

ENDOSCOPE APPARATUS

BACKGROUND OF THE INVENTION

1. Field of the Invention

The present invention relates to an endoscope that is used in the maintenance of industrial plants and buildings, and when performing inspections of interiors of equipment inside which flammable gas or dust is present (for example, the interiors of gasoline tanks, industrial plants, and engines), and when performing inspections of boiler interiors and the like. In particular, the present invention relates to a drive device for an explosion-proof apparatus such as an explosion-proof video system that is able to be used in locations where there is a strong possibility of an explosion occurring.

Priority is claimed on Japanese Patent Application No. 2006-19146, filed Jan. 27, 2006, the contents of which are incorporated herein by reference.

2. Description of Related Art

Conventionally, an endoscope is widely used that, by inserting an elongated insertion portion into a body cavity, makes it possible to observe internal organs inside a body cavity and the like, and, if required, to perform a variety of medical treatments using treatment tools that are inserted through the interior of a treatment tool channel. In addition, in industrial fields as well, industrial endoscopes are widely used for making observations and inspections of damage and corrosion inside boilers, turbines, engines, and chemical plants and the like.

Among endoscopes (i.e., video image systems) that are used in the manner described above, electronic endoscopes (referred to below simply as "endoscopes") exist that have an image pickup element such as a CCD or the like that photoelectrically converts optical images into image signals located in a distal end portion of the insertion portion. In these endoscopes, a structure is employed in which an observation image of an observation position that is illuminated by illumination light supplied from a light source apparatus is formed on an image pickup surface of the image pickup element, and image signals of the observation image that has been photoelectrically converted by this image pickup element are transmitted to an external device in the form of a signal processing section of a camera control unit (referred to below as a CCU). In the CCU, video image signals are created and endoscope images are displayed on a monitor so that an observation can be made.

This type of endoscope device is formed, for example, by an image pickup section that has a solid-state image pickup element provided at a distal end portion thereof that picks up an image of an observation position and also has a light source that illuminates the observation position, and by a control unit that has a power supply and a signal processing section. The control unit and the image pickup section are connected by a cable that is made up of a plurality of electric wires. The supplying of power from the control unit to the image pickup section as well as the sending and receiving of control signals for controlling the image pickup section and video image signals from the image pickup section and the like are conducted via this cable.

Among endoscopes that are used in the field of industry, there are those that are used in hazardous locations such as the pipes of chemical plants and gas tanks and the like, and in explosive atmospheres and the like (referred to below simply as "hazardous locations"). Instruments that are used in these hazardous locations have to at least satisfy safety standard provisions (described below) for intrinsic safety in order to prevent these instruments from becoming a source of ignition and the like.

Because the image pickup section is inserted into a hazardous location of this type and picks up a video image of the interior thereof, a structure is required to satisfy safety standards relating to the supplying of power by the control unit to the image pickup section. Namely, an endoscope device exists that is an explosion-proof video image device in which a barrier limiting circuit that satisfies the aforementioned safety standard provisions is interposed between the power supply of the control unit, and both the image pickup element and light source of the image pickup section (see, for example, Japanese Patent Application, First Publication No. 2001-75020).

[Explanation of Intrinsic Safety]

Intrinsic safety is regulated by the International Electrotechnical Commission (IEC), ATEX (Europe), FM (America), CSA (Canada), TIIS (Japan), and the like, and explosion-proof apparatuses are certified by a certifying body. The description of the present specification is based on the IEC Electrical Apparatus for Explosive Gas Atmospheres standard IEC 60079 and the IEC Electrical Apparatus for Use in the Presence of Combustible Dust standard IEC 61241. However, portions that substantially correspond to the standards of other countries can also be applied to the standards of these other countries and it is of course unnecessary to exclude these other standards.

Consideration will now be given to the mechanism of explosions in hazardous areas. Explosions are generally induced to occur in an environment in which flammable gas or dust mixed together with oxygen are present, as a result of the temperature of an ignition source rising and exceeding the ignition temperature of the mixed gas or dust. For example, inside a gasoline tank, plant and engine, fuel changes into gas or dust and becomes flammable. Ambient oxygen is also present so that a flammable mixture is generated. In this environment, if an ignition source is present such as described above, there is a danger that the temperature of the ignition source will cause an explosion. In other words, the three elements of an explosion are flammable gas or dust, oxygen, and an ignition source, and if even one of these three is not present, then an explosion cannot occur. Of these, flammable gas or dust and oxygen are present in the environment and intrinsic safety is secured basically by blocking any energy applying elements from an ignition source.

In the IEC, locations where an explosion-proof apparatus may be used are defined according to their danger level as Zone 0, Zone 1, or Zone 2. Namely, Zone 0 is where the danger level is the highest, Zone 1 is where the danger level is next highest, and Zone 2 is where the danger level is the next highest. Dangerous areas are referred to as hazardous areas, while areas that are not dangerous are referred to as Non-hazardous areas.

The apparatus structures are defined as "ia" apparatuses, "ib" apparatuses, and "Type-n" apparatuses. "ia" apparatuses have the highest reliability against explosions, while "ib" apparatuses have the next highest reliability. Here, "ia" apparatuses are able to be used in Zone 0 and Zone 1, while "ib" apparatuses are only able to be used in Zone 1. Apparatuses that are able to be used in Zone 0 or Zone 1 are known as intrinsically safe apparatuses. "Type-n" apparatuses are able to be used in Zone 2.

SUMMARY OF THE INVENTION

In accordance with a first aspect of the present invention, an endoscope apparatus is provided. The endoscope apparatus includes: an explosion-proof unit that has an image pickup device that outputs photographed video images as video image signals; and an A/D converter that converts the video image signals into digitalized image signals; a control unit that controls the explosion-proof unit; and an energy limiting circuit that is provided at the control unit and that limits electrical energy of digital signals to satisfy intrinsic safety when sending and receiving of the digital signals, wherein the explosion-proof unit is connected to the control unit via the energy limiting circuit with a signal line.

Here, in a conventional endoscope apparatus, a complex circuit structure is required in which, after analog signals are sent and received in an unmodified configuration between a control unit and an explosion-proof unit, namely, after explosion-proof processing has been performed on both direct current components and alternating current components, they are synthesized and the original analog signals are restored.

However, by employing the above described structure, the endoscope apparatus according to the first aspect is able to control current in accordance with standards for intrinsic safety solely by controlling the transmission current from digital signals. Because it is also possible to lower the voltage level by differentiating using "1" or "0", a complex barrier circuit is not necessary as is the case when transmitting analog signals. It is therefore possible to reduce the size of the barrier circuit in the control unit and thereby also reduce the size of the apparatus. The portability of the control unit is thus improved and it is possible to lower manufacturing costs.

In the endoscope apparatus, the control unit may have: a display unit that displays the image signals that are input via the energy limiting circuit; and a control signal output unit that outputs control signals to the explosion-proof unit via the energy limiting circuit.

In the endoscope apparatus, the energy limiting circuit may have a resistor that is inserted in series on the signal line, and the resistor may have a resistance value corresponding to a cutoff frequency that satisfies transmission speed between the control unit and the explosion-proof unit, and a resistance value that satisfies intrinsic safety.

As a result, the endoscope apparatus satisfies the transmission speed that is required for a digital transmission and is able to perform current limiting in accordance with intrinsic safety apparatuses.

In the endoscope apparatus, the energy limiting circuit may have: a plurality of capacitative elements that are inserted in series on the signal line; and a resistor that is inserted between a signal output side of the capacitative elements and an earth.

As a result, the endoscope apparatus makes it possible to simply construct a power supply limiting device, and makes it possible to reduce the size of the barrier circuit in the control unit and thereby also reduce the size of the apparatus. The portability of the control unit is thus improved and it is possible to lower manufacturing costs.

In the endoscope apparatus, the control unit may have a power supply unit that supplies driving power via a power supply line to the explosion-proof unit, and a second energy limiting circuit may be provided on the power supply line via which the driving power is supplied from the power supply unit so that the second limiting circuit corresponds to the explosion-proof unit that satisfies intrinsic safety.

In the endoscope apparatus, the second energy limiting circuit may have: a resistor that is inserted in series on the power supply line; and Zener diodes whose cathode or anode is connected to the resistor and whose anodes or cathodes are earthed.

In the endoscope apparatus, the second energy limiting circuit may have: a current-limit circuit that has FET or transistors that are inserted in series on the power supply line; and a plurality of Zener diodes that are connected to the current-limit circuit.

As a result, the endoscope apparatus makes it possible not only to guarantee intrinsic safety standards for signal lines on which the sending and receiving of data is conducted, but also to supply power that corresponds to the intrinsic safety standards.

In the endoscope apparatus, the image pickup device may be a CMOS image sensor.

In the endoscope apparatus, the signal line, which connects the explosion-proof unit and the control unit, may serve as a high speed serial interface and as a high speed transmission wire to multiplex signals that are transmitted between circuits.

As a result, the endoscope apparatus makes it possible to decrease the number of signal lines between an explosion-proof unit and a control unit, and it is possible to achieve a decrease in energy limiting circuits and a corresponding improvement in reliability in preventing explosions.

In the endoscope apparatus, the explosion-proof unit further may have: an insertion portion at a distal end portion of which the image pickup device is provided; and an image processing unit that is provided at a distal side of the insertion portion and that image-processes the digital signals being from the A/D converter.

In the endoscope apparatus, the explosion-proof unit further may have: an insertion portion at a distal end portion of which the image pickup device is provided; and an image processing unit that is provided at a proximal side of the insertion portion and that image-processes the digital signals being from the A/D converter.

DETAILED DESCRIPTION OF THE INVENTION

A drive device for an endoscope apparatus according to embodiments of the present invention will now be described with reference made to the drawings.

Figure 1:
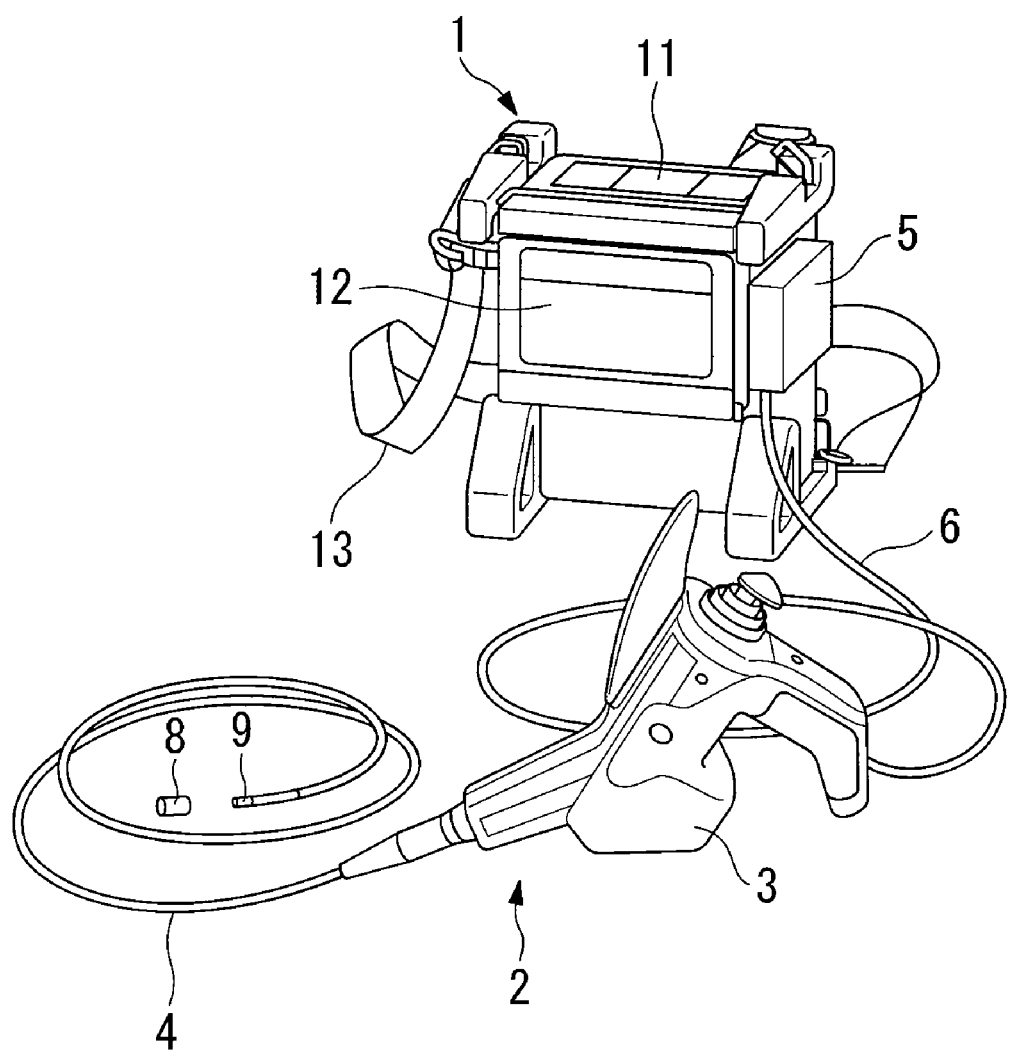
FIG. 1 is a perspective view showing an exterior structure of an endoscope device of the first (and second and third) embodiment of the present invention.

First Embodiment:

FIG. 1 is a conceptual view showing an outline of an endoscope device (i.e., an explosion-proof video image device) serving as the first embodiment of the present invention. In FIG. 1, a main unit controls the entire endoscope device. A front panel (operation panel) 11 that is used for making various settings is provided on a top surface of the main unit 1. An LCD monitor 12 that is used to display monitor images is mounted on a side surface of the main unit 1. A belt 13 can be fitted onto the main unit 1 so that a user is able to hang the main unit 1 from their shoulder and perform hands-free operation.

A scope unit 2 is formed by a control unit 3, an insertion portion 4 that is attached to the control unit 3, and an optical adaptor 8 that is removably attached to a distal end of the insertion portion 4. The control unit 3 is removably attached to the main unit 1 by a scope connector 5. In the first embodiment of the present invention, as described below, an energy limiting circuit (i.e., a barrier circuit) that is used to limit energy is provided inside the scope connector 5. The main unit 1 and the control unit 3 are connected together by a universal cable.

The insertion portion 4 is provided with flexibility in order that it can photograph various types of object.

Moreover, a bending portion 9 is provided at a distal end portion of the insertion portion 4. A motor is provided inside the control unit 3 and the bending portion 9 is able to be bent up and down and left and right by this motor. By bending the bending portion 9, the direction of photography can be set as is desired.

The optical adaptor 8 is removably attached to the distal end of the insertion portion 4. Optical adaptors having a variety of optical properties are prepared as the optical adaptor 8 and, by switching the optical adaptor 8, it is possible to alter the angle of vision, the direction of vision, the brightness, the depth of observation, and the like.

Figure 2A:
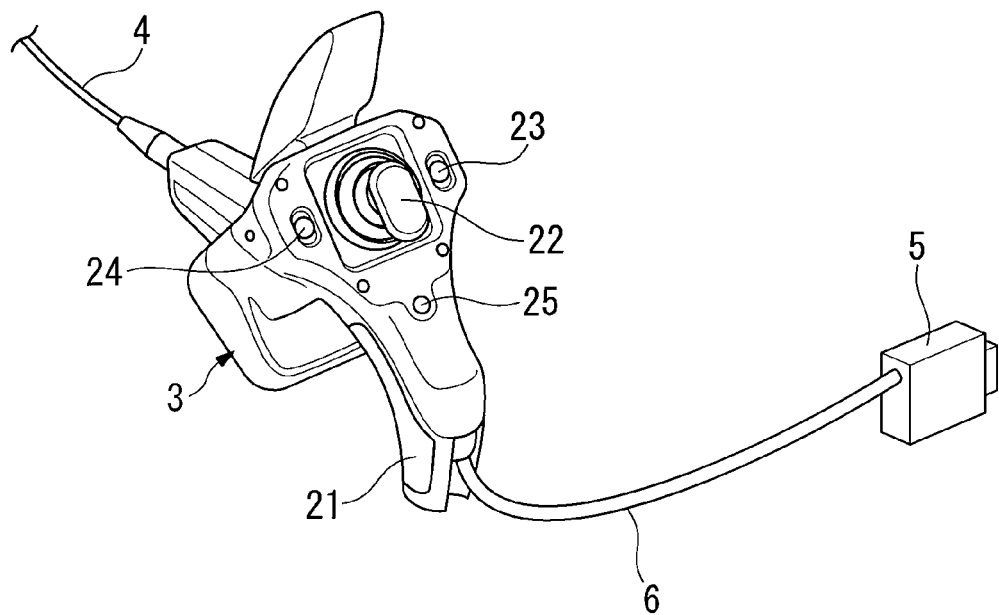
FIGS. 2A and 2B are perspective views showing an exterior structure of a control unit of an endoscope device of the first (and second and third) embodiment of the present invention.
Figure 2B:
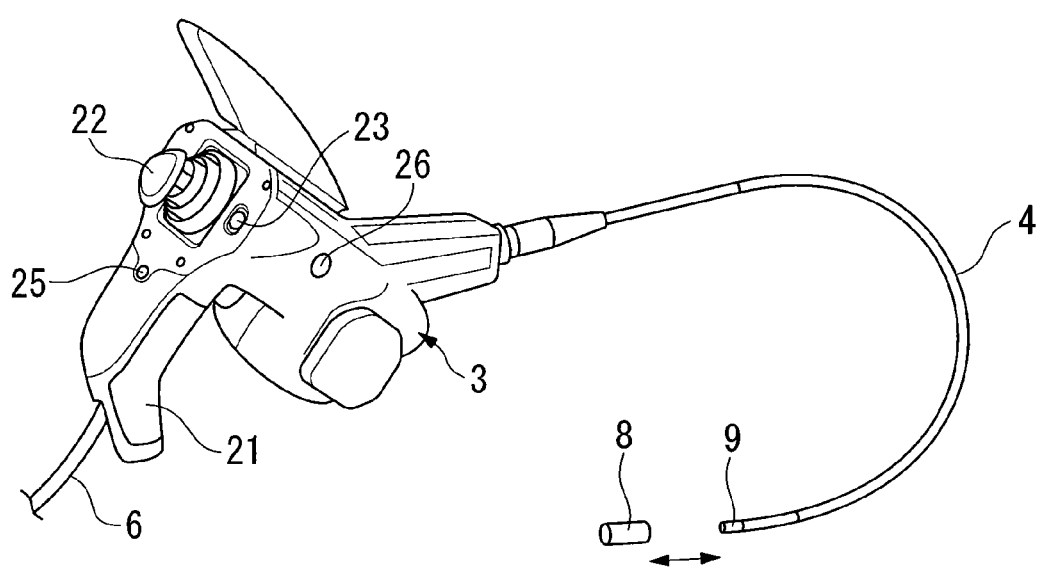

The control unit 3 is the section that operates the endoscope device based on commands from a user. As shown in FIGS. 2A and 2B, a grip portion 21 is formed on the control unit 3. A user is able to manually operate the endoscope by gripping this grip portion 21.

As shown in FIG. 2A, a joystick 22, a zoom lever 23, a brightness adjustment lever 24, and a boost button 25 are located on the control unit 3. The joystick 22 is used to manipulate the direction of the bending portion 9 at the distal end of the insertion portion 4. The boost button 25 is used for altering the gain.

As shown in FIG. 2B, a freeze recording button 26 is located on a side surface of the control unit 3. By pressing the freeze recording button, a still image at that instant is captured and recorded.

Figure 3:
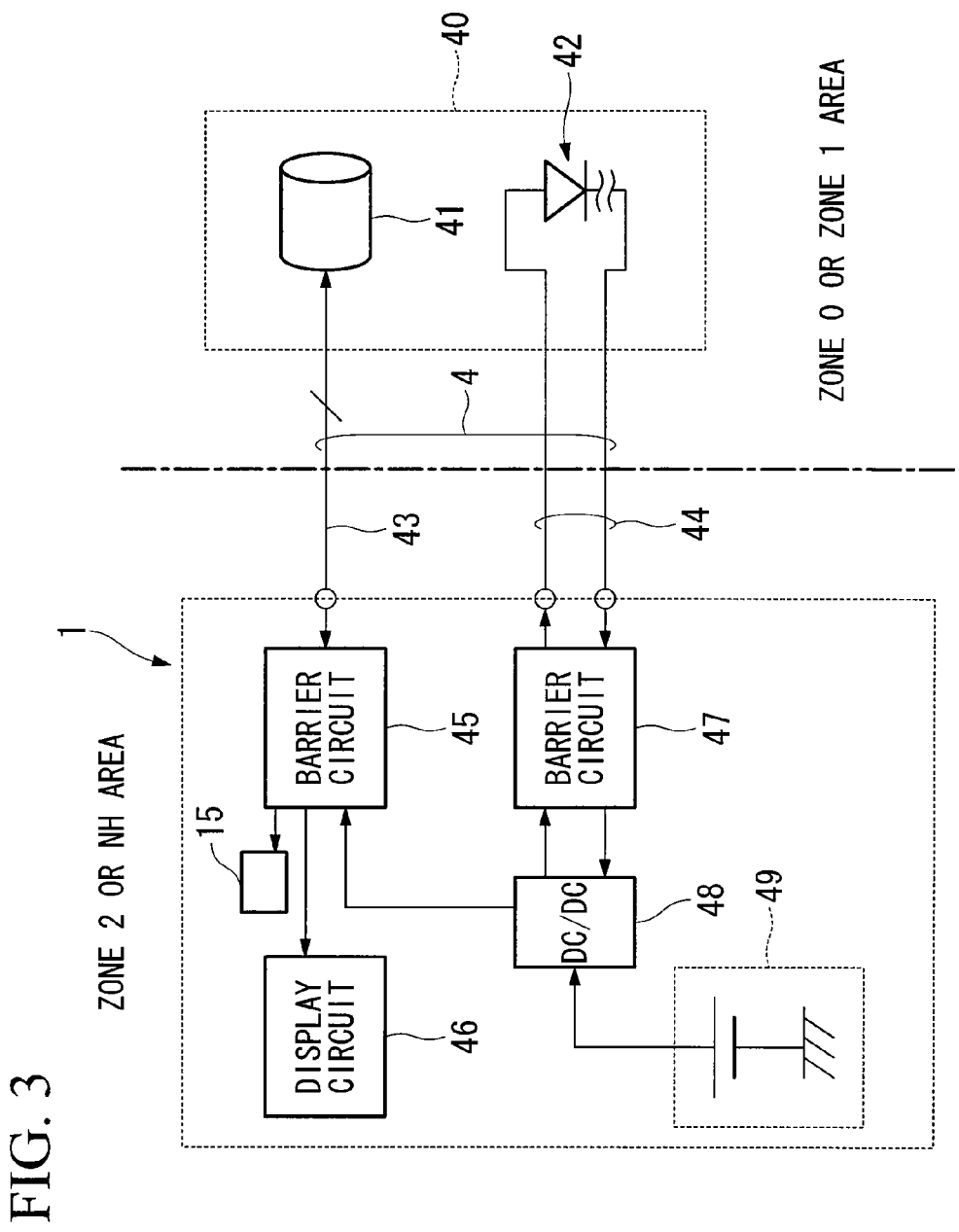
FIG. 3 is a conceptual view illustrating a drive device for an explosion-proof apparatus according to the first (and second and third) embodiments of the present invention.

FIG. 3 is a conceptual view showing an outline of the structure of a distal end 40 of the insertion portion 4, and the main unit 1. Here, the main unit 1 and the insertion portion 4 are connected together via the control unit 3, and because the control unit 3 and the insertion portion 4 are carried into a hazardous area (i.e. Zone 0 or Zone 1) when being used, the control unit 3 and the insertion portion 4 are formed integrally as the insertion portion 4, and the structure of the scope unit is omitted. The main unit 1 is used in Zone 2 or in a NH area.

A camera head module 41 (to which an image pickup element such as a CMOS image sensor or the like is attached) and an illumination portion 42 and the like are provided in the scope unit 2 (i.e., at the distal side of the insertion portion 4). The illumination portion 42 is formed by an LED array to which a plurality of LED are connected. The illumination portion 42 is turned on so as to illuminate the object being photographed by the camera head module 41. A signal line 43 that is used to transfer data between the camera head module 41 and the main unit 1, as well as power supply lines 44 that are used to generate light in the illumination portion 42 are housed in the insertion portion 4. In addition, power supply lines that supply power to drive the camera head module 41 are also included in the signal line 43.

A barrier circuit 45, a display circuit 46, a barrier circuit 47, a DC/DC converter 48, and a battery 49 and the like are mounted in the main unit 1.

The display circuit 46 is connected to the camera head module 41 via the barrier circuit 45 and the insertion portion 4, and monitor images that are data of photographed video images are input into the display circuit 46 so that monitor images are displayed on the LCD monitor 12. A camera control unit A 15 controls the camera head module 41. The barrier circuit 45 transmits the digital data that is output from or input into the display unit 46 and is sent and received using the signal line 43 as a transmission current whose current value is restricted. The barrier circuit 45, by limiting the current value of the transmission current that flows as a result of these digital signals being transmitted, can confine the electrical energy arising from the transmission of the digital signals to less than that stipulated by the safety standard provisions for intrinsic safety.

Moreover, the barrier circuit 45 limits the current that flows when the camera head module 41 is being driven, namely, limits the current energy to less than that stipulated by the safety standard provisions for intrinsic safety, and supplies power used for driving to the camera head module 41.

The DC/DC converter 48 converts the voltage value of the battery 49 and supplies power to the barrier circuit 45 and the barrier circuit 47. The barrier circuit 47 supplies power via the power supply lines 44 that the illumination portion 42 uses to generate light.

Figure 4:
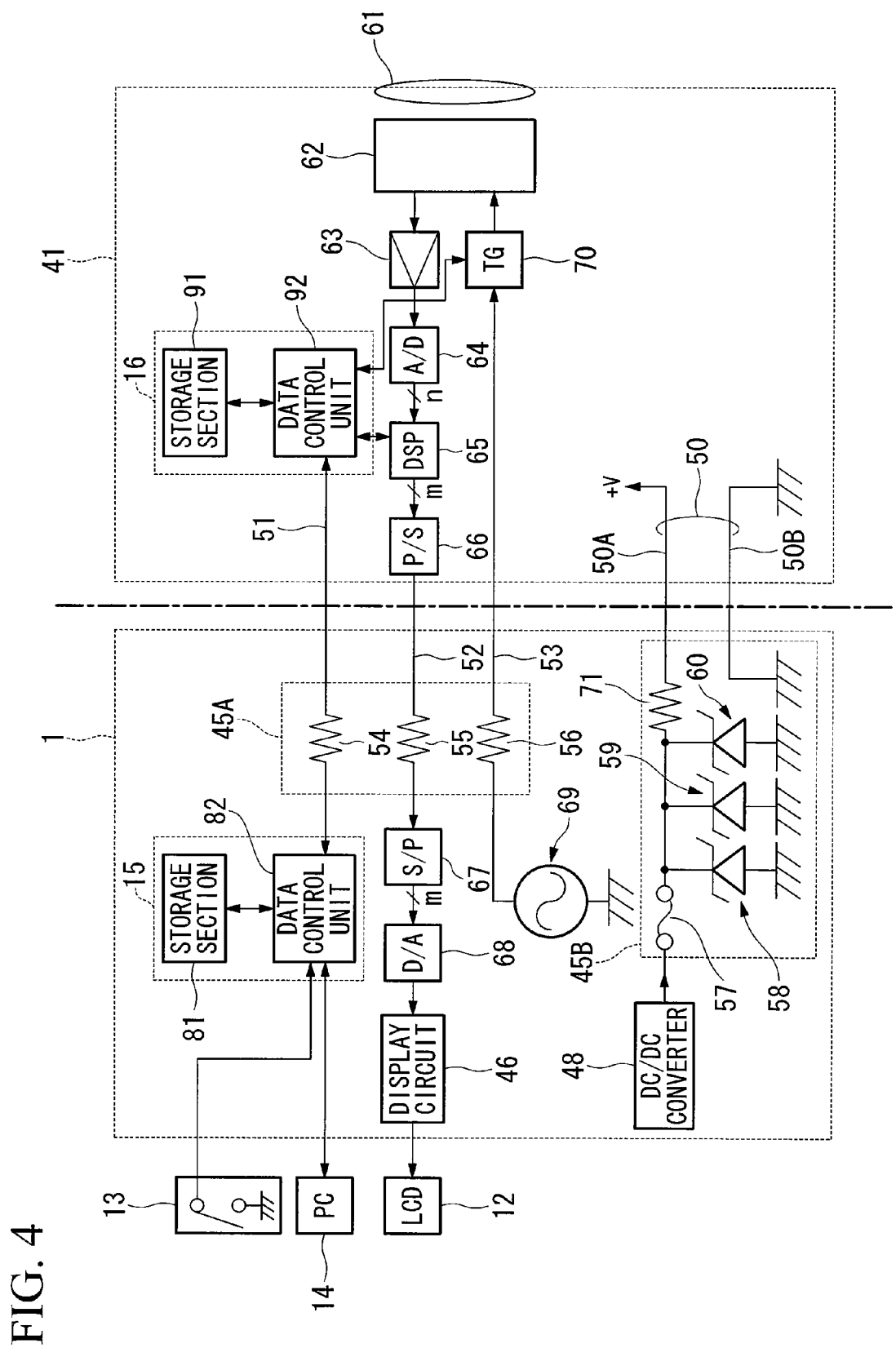
FIG. 4 is a block diagram showing a structural example of a camera head module and display circuit in FIG. 1 according to the first embodiment.

Next, a description will be given with reference made to FIG. 4 of the connection interrelationships and structural details of the display circuit 46, the camera control unit A 15, the camera control unit B 16, the barrier circuit 45, and the camera head module 41 that constitute the principal structure of the present invention. FIG. 4 is a conceptual view showing an example of the structure of the display circuit 46, the barrier circuit 45, and the camera head module 41 shown in FIG. 3.

The camera control unit A 15 is formed by a storage section 81 in which a variety of control data is stored, and a data control unit 82 that controls the main unit 1 and the camera head module 41. Moreover, the main unit 1 has a serial-parallel converter 67, a D/A converter 68, and an oscillator 69. The data control unit 82 is formed by a microprocessor or the like having computing capabilities such as a CPU.

Note that the data control unit is able to be connected to a switch 13 and a PC or the like 14 and is able to set the conditions of the camera head. This can be performed by communication with the SW 13 or PC 14.

Here, in order to control the camera head module 41, the data control unit 82 outputs the aforementioned control data to the camera head module 41, and also receives response data and the like for control from the camera head module 41. The storage section 81 is formed by an $E^2$PROM or flash memory or the like. The serial-parallel converter 67 converts "m" bits of serial video image data that is input from the camera head module 41 into "m" bits of parallel video image data and then outputs it. The D/A converter 68 converts the "m" bits of input video image data into video image signals corresponding to the LCD monitor 12, namely, to voltage levels corresponding to video image data, and then outputs these to the LCD monitor 12.

The camera head module 41 has a lens 61, an image pickup element 62, a preamp 63, an A/D converter 64, a parallel-serial converter 66, a timing generator 70, and a camera control unit B 16. The camera control unit B 16 has a storage section 91 and a data control unit 92. The data control unit 92 is formed by a microprocessor or the like that has computing capabilities such as a CPU. The image pickup element 62 may be, for example, a CMOS image sensor or a CCD or the like. Reflected light from an object that is illuminated by the illumination portion 42 via the insertion portion 4 is condensed in a pixel portion via the insertion portion 4 and the lens 61. The light intensity of the light that is received by each pixel of the pixel portion is converted into image signals, which are electrical signals, and these are output so as to correspond to a predetermined output timing. The timing generator 70 receives inputs of clock signals from the oscillator 69 and, based on these clock signals, creates the aforementioned output timing for the data from each pixel of the image pickup element 62. Settings for this timing generator 70 are also made by the data control unit 92.

The preamp 63 converts image signals input from the image pickup element 62 to voltage levels that allow them to be converted by the A/D converter 64. The A/D converter 64 performs analog-digital conversions to convert the image signals, namely, the voltage levels input from the preamp 63 into corresponding digital numerical values, and then outputs these as "n" bits of image data (i.e., gradation data). The "n" bits are determined by the resolution of the A/D converter 64. Namely, the A/D converter 64 divides the voltage range between the maximum voltage value and the minimum voltage value that are input from the preamp 63 into "n" portions, and, taking the input voltage as corresponding gradations of digital values, creates image data.

A DSP 65 performs signal processing on the input image data and performs signal processing to convert it into "m" bits of standard video image data. For example, the DSP 65 performs processing such as processing to convert RGB data into YCrCb data, correction processing of image data based on the photoelectric conversion characteristics of the image pickup element 62, and correction processing of image data based on the display characteristics of the LCD monitor 12, and outputs video image data. Here, the image data output by the DSP 65 may be in any form provided that it conforms to standards for video image signals such as RGB, YPbPr, YCC, composite signals, and the like. The data control unit 92 is able to store setting data for the DSP 65 and the TG 70 in the storage section 91. In addition, in some cases, the DSP 65 may temporarily store the aforementioned video image data in the storage section 91 as a result of being so controlled by the data control unit 92, and subsequently read it in a single block and output it to the main unit 1. This storage section 91 is formed by an E$^2$PROM or flash memory or the like. The parallel-serial converter 66 converts video image data that was input in "m" bits of parallel data into "m" bits of serial data. In this embodiment, the DSP 65 is provided at the proximal side of the insertion portion 4. In the other embodiment, the DSP 65 can be provided in the main unit 1.

The barrier circuit 45 limits electrical energy from digital signals and power when these are supplied. The barrier circuit 45 is formed by a barrier circuit 45A that transmits (i.e., allows to flow) digital signals that are sent and received by the main unit 1 and the scope unit 2 in the form of transmission current whose current value is limited, and a barrier circuit 45B that limits the current value (i.e., the current energy) that is supplied to the control unit 3 and supplies the current. The barrier circuit 45A is formed by a current limiting resistor 54 that is inserted partway along a signal line 51 that connects the data control unit 82 and the data control unit 92, a current limiting resistor 55 that is inserted partway along a signal line 52 that connects the serial-parallel converter 67 and the parallel-serial converter 66, and a current limiting resistor 56 that is inserted partway along a signal line 53 that connects the oscillator 69 and the timing generator 70. By employing this type of structure, if a failure state occurs, the electrical energy of the respective transmission currents is consumed by the voltage drop generated in the current limiting resistors 54, 55, and 56 that are inserted on each of the signal lines 51, 52, and 53, and it is possible to prevent excessive current (i.e., overcurrent) flowing into the respective signal lines 51, 52, and 53. Namely, both the voltage value of the digital signals transmitted to the signal lines and the current value of the transmission current are lowered by the above-described respective current limiting resistors, and the electrical energy of the digital signals is limited.

Here, as the resistance values of each of the above described current limiting resistors is set in a range between a numerical value that is less than the current value shown in the safety standards for intrinsic safety is used for the minimum value Rmin, and a numerical value that forms the cutoff frequency fc for satisfying the transmission speed is used for the maximum value Rmax. Namely, in the method used to set resistance values for the current limiting resistors, for example, the resistance values may be calculated from the cutoff frequencies fc determined by the capacity values Cs for the stray capacities of the camera head module 41 and the signal lines 51 to 53 towards each of the current limiting resistors. Namely, it is necessary for the above described current limiting resistors to be set to a numerical value that satisfies a current value corresponding to the safety standards for intrinsic safety and also to a numerical value that enables the cutoff frequency fc to satisfy the transmission speed of the digital signals.

Here, if the maximum value of the resistance value is Rmax, the capacity value of the stray capacity of the transmission path is Cs, and the transmission clock frequency that determines the transmission speed is the cutoff frequency fc, then this cutoff frequency fc is expressed by the following formula:

$$fc = 1/(2\pi \cdot R\max \cdot Cs)$$

The resistance value R from the above formula is expressed by the following formula:

$$R\max = 1/(2\pi fc \cdot Cs)$$

For example, if the transmission clock frequency is set to 10 MHz ($=10 \times 10^6$ Hz), and the capacity value Cs of the stray capacity on the transmission paths (of the camera head module 41 and the respective signal lines 51 to 53) is set to 10 pF ($=10 \times 10^{-12}$ F), then a resistance value Rmax that satisfies fc$=10 \times 10^6$ Hz is determined in the following manner.

$$\begin{aligned} R\max &= 1/(2\pi \cdot fc \cdot Cs) \\ &= 1/(2\pi \times 10 \times 10^6 \times 10 \times 10^{-12}) \\ &= 1/(2\pi \times 10^{-4}) \\ &= 1.59 \text{k}(\Omega) \end{aligned}$$

As described above, when the transmission clock frequency is 10 MHz and the capacity value Cs of the stray capacity is 10 pF, then a current limiting resistor that is less than 1.59 k ($\Omega$), and is within a range of the minimum resistance Rmin that is less than the current indicated in the safety standards for intrinsic safety is set and used. Namely, the above described current limiting resistors are set so as to correspond to the capacity value Cs of the stray capacity within a range between a resistance value that forms a cutoff frequency fc that satisfies the transmission speed between the scope connector 5 of the main unit 1 (i.e., the control unit) and the camera head module 41 and a resistance value that sets a current value that satisfies intrinsic safety standards. The capacity value Cs for the stray capacity that is used is the numerical value that is actually measured on each signal line, and the transmission clock frequency is also matched to the transmission speed corresponding to each signal line. By employing this type of structure, the transmission speed of sent and received digital signals is satisfied, while the energy of the digital signal lines is limited. Energy is consumed by the voltage drop generated in the current limiting resistor inserted along each signal line, and it is possible to prevent excessive current flowing into the signal lines.

The barrier circuit 45B is inserted on a power supply line 50 that connects the DC/DC converter 48 shown in FIG. 3 and the power supply line of the camera head module 41. This power supply line 50 is formed by a power supply line 50A that supplies power and an earth wire 50B. A fuse 57 is inserted in series on the input side of this barrier circuit 45B, namely, is connected to a terminal that is connected to the DC/DC converter 48, while Zener diodes 58, 59, and 60 are connected to the output side of the fuse 57 (i.e., the three Zener diodes are inserted in parallel between the output side of the fuse 57 and the earth). A current limiting resistor 71 is inserted in series between cathodes of these Zener diodes and the power supply line 50A.

The above described barrier circuit 45B indicates an example of an energy limiting circuit of the type that satisfies "ia" apparatus standards, and is an energy limiting circuit for direct current. As described above, the barrier circuit 45B for direct current provides a circuit in which the fuse 57 and the current limiting resistor 71 are connected in series on the power supply line 50. Moreover, it provides the three Zener diodes 58, 59, and 60 between the fuse 57 and current limiting resistor 71 and an earth. By providing the three Zener diodes 58, 59, and 60 in this manner, when a fault occurs the voltage of the power supply line 50 is not allowed to rise above the Zener voltage of the Zener diodes 58, 59, and 60.

Note that the reason why three Zener diodes 58, 59, and 60 are provided is so that, even if two of the three Zener diodes are damaged, at least one Zener diode will remain, thereby guaranteeing reliability and satisfying the standards for "ia" apparatuses. By employing this type of structure, when a fault occurs, energy is consumed by the voltage drop that is generated in the current limiting resistor 71, and it is possible to prevent excessive voltage flowing into the power supply line 50. The role of the fuse 57 is so that components having a low rated power can be used for the current limiting resistor 71 and the Zener diodes 58, 59, and 60, and a reduction in the size of the components can be achieved.

Note also that if the oscillator 69 is incorporated in the camera head module 41, then that the current limiting resistor 56 naturally becomes unnecessary and the barrier circuit 45A is simplified.

Figure 5:
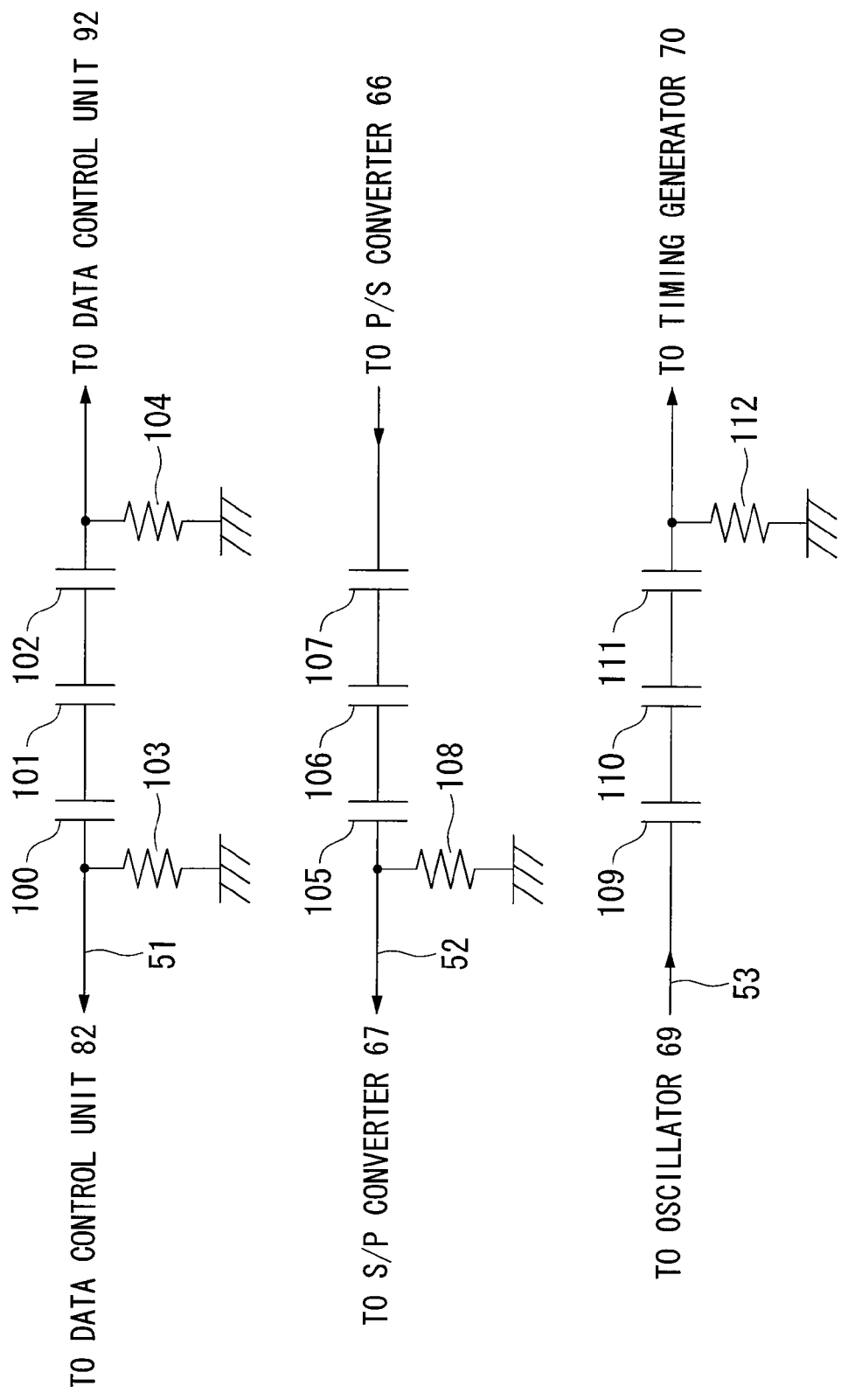
FIG. 5 is a block diagram showing an example of an energy limiting circuit according to the second embodiment of the present invention.

Second Embodiment:

The second embodiment of the present invention is an endoscope device in which the barrier circuit 45A of the first embodiment shown in FIG. 4 is replaced with the structure shown in FIG. 5. The structure of the second embodiment is the same as that of the first embodiment except for the barrier circuit 45A. As described below, by inserting a plurality of coupling condensers in each signal line, the flow of direct current between the circuits of the main unit 1 and the control unit 3 is interrupted, and the current value of the transmission current of the digital signals is limited so as to limit electrical energy in the transmission of the digital signal.

FIG. 5 shows a barrier circuit for an alternating current, however, alternating current components of digital signals starting with image data are transmitted. As shown in FIG. 5, in the barrier circuit 45A for alternating current, a structure is employed in which a condenser series (made up of a plurality of condensers) formed by three condensers that are connected in series, namely, the coupling condensers 100, 101, and 102 are inserted on the signal line 51, and both ends of this condenser series are earthed via resistors 103 and 104. By employing this structure, direct current energy between the data control units 82 and 92 is cut by the condenser series so as to limit the energy.

Moreover, as shown in FIG. 5, a structure is employed in which a condenser series made up of three condensers, namely, the coupling condensers 105, 106, and 107 that are connected in series is inserted on the signal line 52, and an end portion on the side on which digital signals are received from the condenser series, namely, the end portion on the serial-parallel converter 67 side is earthed via a resistor 108. By employing this structure, direct current energy on the signal line 52 from the parallel-serial converter 66 is cut by the condenser series. In the same way, a structure is employed in which a condenser series made up of three condensers, namely, the coupling condensers 109, 110, and 111 that are connected in series is inserted on the signal line 53, and an end portion on the side on which digital signals are received from the condenser series (i.e., the condenser series output side), namely, the end portion on the timing generator 70 side is earthed via a resistor 112. By employing this structure, direct current energy from the oscillator 69 is cut by the impedance of the condenser series.

Note that the reason why three coupling condensers are provided on the aforementioned respective signal lines is so that, even if two of the three coupling condensers are damaged, reliability can be guaranteed by the remaining coupling condenser. As a result, the standards for "ia" apparatuses are satisfied (in order to satisfy the standards for "ib" apparatuses, a condenser series is used in which two coupling condensers are connected in series). Moreover, the aforementioned resistors 103, 104, 108, and 112 are provided in order to terminate the output side of the condenser series. Note that, in FIG. 5, the resistors 103, 104, 108, and 112 are individual resistors, however, they may be substituted by IC input impedance that is equivalently connected. In this case, the resistors 103, 104, 108, and 112 can be omitted.

In the above described structure, circuit input terminals are connected to the end portions on the receiving side of the condenser series and, in most cases, these have high impedance input resistance and are provided such that the end portions of the condenser series do not enter a floating state. In some cases, all the energy limiting circuits that are inserted on the signal line 52 are provided on the receiving side of digital signals in order that digital signals can be sent and received, therefore, the terminating resistors are provided on both ends.

Figure 6:
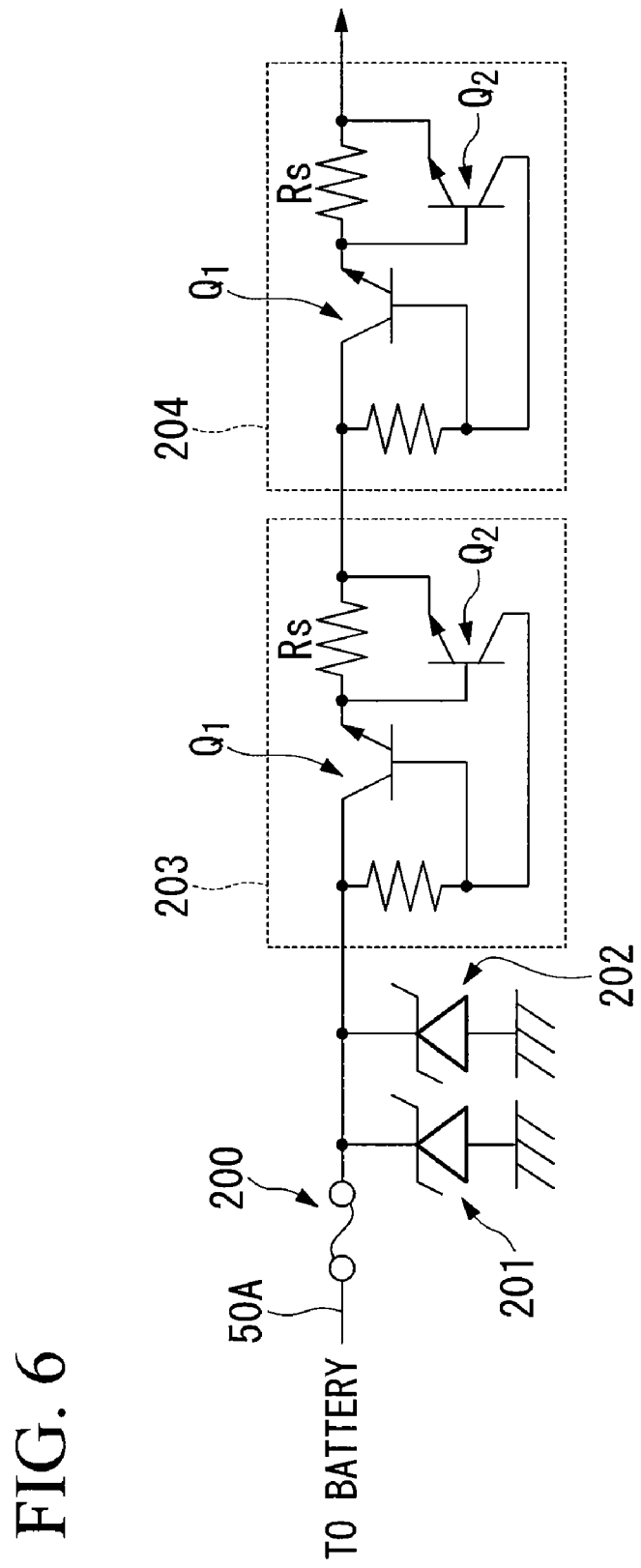
FIG. 6 is a block diagram showing an example of an energy limiting circuit according to the third embodiment of the present invention.

Third Embodiment:

The third embodiment of the present invention is an endoscope device in which the barrier circuit 45B of the first embodiment shown in FIG. 4 is replaced with the structure shown in FIG. 6. The structure of the third embodiment is the same as that of the first embodiment except for the barrier circuit 45B.

The barrier circuit 45B shown in FIG. 6 indicates an example of a barrier circuit of the type that satisfies "ib" apparatus standards, and is a barrier circuit for direct current that supplies drive power. This barrier circuit 45B is a current limiting type of overload protection circuit. When a predetermined limit current value is exceeded, the barrier circuit 45B controls the output voltage so that it equals the limit current value and thereby limits the energy.

As shown in FIG. 6, in a barrier circuit for direct current, a fuse 200 and current limiting circuits 203 and 204 that are each formed by two transistors Q1 and Q2 are inserted in series on the power supply line 50A. Here, the current limiting circuit 203 and the current limiting circuit 204 constitute a current limiting circuit series that is connected in series. In FIG. 6, bipolar transistors are used for the transistors Q1 and Q2, however, MOS (metal oxide semiconductors)-FET (field effect transistors) such as FET may also be used.

Two Zener diodes 201 and 202 are inserted in parallel on the power supply line 50A. Note that the reason why the two groups of energy limiting circuits 203 and 204 are provided as current limiting devices is so that, even if one of the two current limiting circuits 203 and 204 is damaged, the undamaged energy limiting circuit will limit the current and thereby limit the energy, consequently guaranteeing reliability and satisfying the standards for "ib" apparatuses. In the same way, the reason why the two Zener diodes 201 and 202 are provided is so that, even if one of the two Zener diodes 201 and 202 is damaged, the undamaged Zener diode will limit the voltage, thereby guaranteeing reliability and satisfying the standards for "ib" apparatuses. By providing the two Zener diodes 201 and 202 in this manner, the voltage of the power supply line 50A is prevented from rising.

By employing this type of structure, when a fault occurs, current is blocked from flowing into the power supply line 50A by the energy limiting circuits 203 and 204. Namely, in each of the energy limiting circuits 203 and 204, if there is an increase in the current value of the current flowing into the power supply line 50A, the voltage at the two ends of the resistors Rs increases and when it exceeds the voltage VBE between the base and emitter of the transistor Q2, the transistor Q2 is turned on. This results in the transistor Q1 being turned off. As a result, the current flowing to the power supply line 50A is blocked.

Moreover, it is also possible to provide all of the barrier circuits 45A and 45B of the first embodiment, the barrier circuit 45A of the second embodiment, and the barrier circuit 45B of the third embodiment, and to combine and use the structures of the barrier circuits in each of the embodiments so as to conform with the respective standards.

Figure 7:
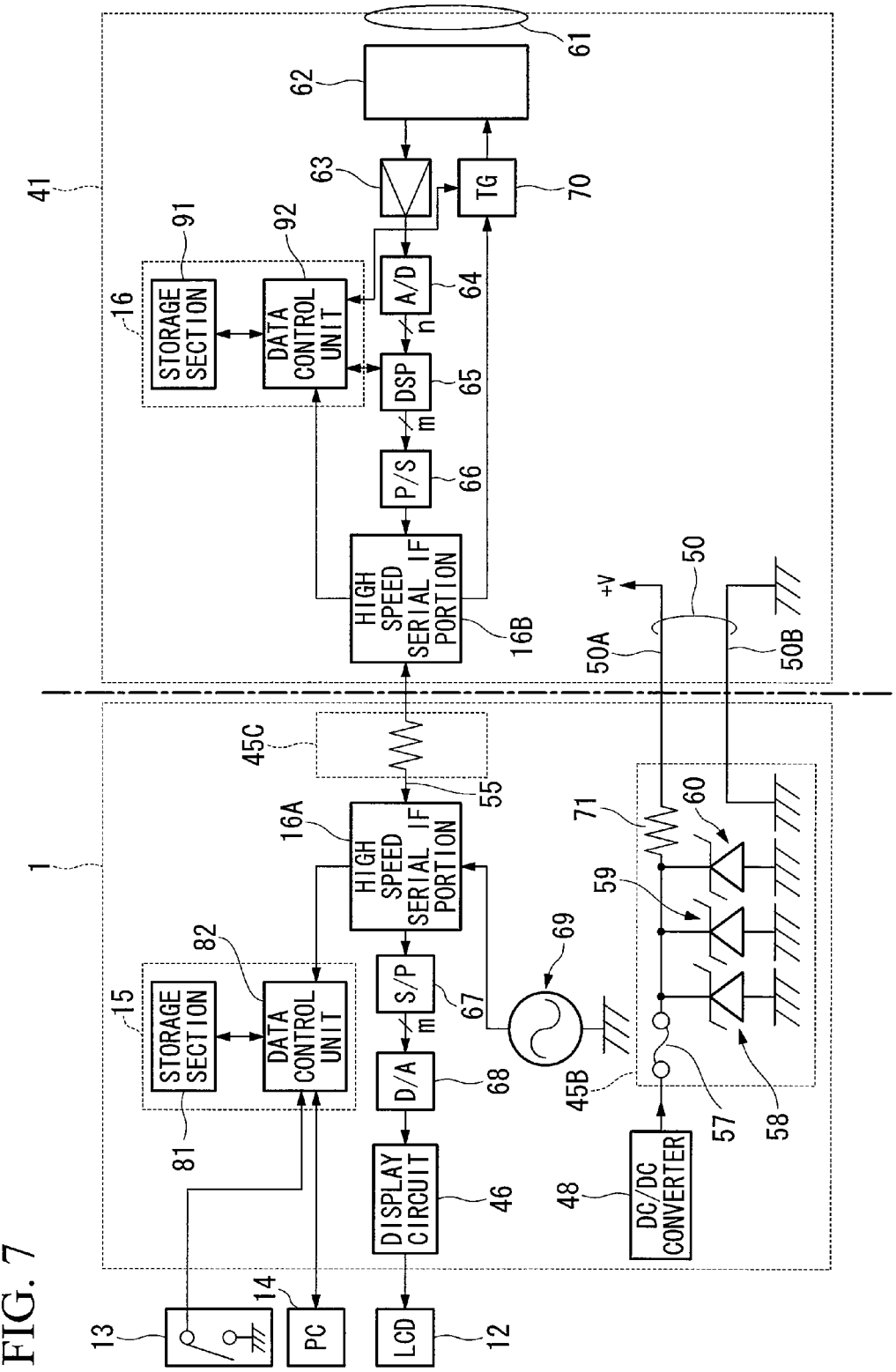
FIG. 7 is a block diagram showing a structural example of a camera head module and display circuit in FIG. 1 according to the fourth embodiment of the present invention.

Fourth Embodiment:

The fourth embodiment of the present invention is an endoscope device in which the barrier circuit 45A of the first embodiment shown in FIG. 4 is replaced with a barrier circuit 45C, as shown in FIG. 7. The structure of the fourth embodiment is the same as that of the first embodiment except for the barrier circuit 45C, and except for a structure in which signals that were transmitted by the signal lines 51 to 53 are multiplexed by high speed serial interface portions 16A and 16B and are transmitted solely by a signal line 55 (i.e., a high speed transmission wire). That is, in this embodiment, the signal line, which connects the camera head module 41 and the main unit 1, serves as a high speed serial interface and as a high speed transmission wire.

Here, a USB interface or IEEE 1394 interface or the like may be used for the high speed serial interface.

As described above, in the present embodiment, data communications between a plurality of devices, namely, three signals in the form of data that is sent and received between the data control units 82 and 92, digital video image signals that are sent by the parallel-serial converter 66, and clocks from the timing generator are multiplexed and then the data is sent and received by a high speed serial interface. For example, each circuit shares the signal line 55 using a carrier sensing mechanism. This uses a time shifting multiplexing system in which a check is made to confirm that a signal line is not being used by another circuit, and if it is free, then the transmission is executed.

By using a high speed serial interface, it is possible to send and receive video image data and control data using a small number of signal lines, so that the efficiency of the barrier circuit is improved.

Moreover, an interface such as a USB or IEEE 1394 has been illustrated, however, the present invention is not limited to this system and, provided that high speed serial communication is employed, then a LAN communication device such as the Internet, or a Rocket I/O type of communication device that is capable of optical communication using optical fibers may also be used.

According to the endoscope apparatus, in a device structure that is made up of an explosion-proof apparatus and a drive device that controls this explosion-proof apparatus, because the sending and receiving of information between an explosion-proof apparatus and a drive device is conducted by digital signals, the circuit structure is simplified compared with an energy limiting circuit for sending and receiving conventional analog signals. Therefore, it is possible to reduce the size of the barrier circuit that is provided on a signal line and it becomes possible to provide a small-size, lightweight device having excellent portability that satisfies safety standards for intrinsic safety.

That is, according to the present invention, a highly portable and lightweight endoscope apparatus that, in an apparatus structure that is made up of an explosion-proof apparatus and a drive device that controls this explosion-proof apparatus, satisfies safety standards for intrinsic safety in signal wires that transfer signals between the explosion-proof apparatus and the drive device, is provided.

In the description in the embodiments, an endoscope apparatus that is used in hazardous locations as an example, however, the present invention is not limited to this endoscope device and it may also be applied to robots that are operated in hazardous locations, display units that use LED, and explosion-proof instruments of system instruments and the like (i.e., those portions in which the image pickup portion of the embodiments is provided), namely, it may also be applied to applications where energy limiting of the sending and receiving of digital signals and of the supplying of power is essential.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. An endoscope apparatus configured for use in a potentially explosive environment, the endoscope comprising:
    an explosion-proof unit that has an image pickup device that outputs photographed video images as video image signals; and an A/D converter that converts the video image signals into digitalized image signals;
    a control unit that controls the explosion-proof unit; and an energy limiting circuit that is provided at the control unit and that limits electrical energy of digital signals to satisfy intrinsic safety when sending and receiving of the digital signals, wherein the explosion-proof unit is connected to the control unit via the energy limiting circuit with a signal line, and the energy limiting circuit is configured to limit a current value, which is transmitted through the signal line by the digital signals, to be the current value that satisfies the intrinsic safety, and limits a cutoff frequency to be transmission clock frequency that determines a transmission speed of the digital signals to an extent sufficient to eliminate the digital signals as a factor in causing explosion in said potentially explosive environment.

2. The endoscope apparatus according to claim 1, wherein the control unit has: a display unit that displays the image signals that are input via the energy limiting circuit; and a control signal output unit that outputs control signals to the explosion-proof unit via the energy limiting circuit.

3. The endoscope apparatus according to claim 1, wherein the energy limiting circuit has a resistor that is inserted in series on the signal line, and wherein the resistor has a resistance value corresponding to a cutoff frequency that satisfies transmission speed between the control unit and the explosion-proof unit, and a resistance value that satisfies intrinsic safety.

4. The endoscope apparatus according to claim 1, wherein the energy limiting circuit has: a plurality of capacitative elements that are inserted in series on the signal line; and a resistor that is inserted between a signal output side of the capacitative elements and an earth.

5. The endoscope apparatus according to claim 1, wherein the control unit has a power supply unit that supplies driving power via a power supply line to the explosion-proof unit, and wherein a second energy limiting circuit is provided on the power supply line via which the driving power is supplied from the power supply unit so that the second limiting circuit corresponds to the explosion-proof unit that satisfies intrinsic safety.

6. The endoscope apparatus according to claim 5, wherein the second energy limiting circuit has: a resistor that is inserted in series on the power supply line; and Zener diodes whose cathode or anode is connected to the resistor and whose anodes or cathodes are earthed.

7. The endoscope apparatus according to claim 5, wherein the second energy limiting circuit has: a current-limit circuit that has FET or transistors that are inserted in series on the power supply line; and a plurality of Zener diodes that are connected to the current-limit circuit.

8. The endoscope apparatus according to claim 1, wherein the image pickup device is a CMOS image sensor.

9. The endoscope apparatus according to claim 1, wherein the signal line, which connects the explosion-proof unit and the control unit, serves both as a high speed serial interface and as a high speed transmission wire to multiplex signals that are transmitted between circuits.

10. The endoscope apparatus according to claim 1, wherein the explosion-proof unit further has: an insertion portion at a distal end portion of which the image pickup device is provided; and an image processing unit that is provided at a distal side of the insertion portion and that image-processes the digital signals being from the A/D converter.

11. The endoscope apparatus according to claim 1, wherein the explosion-proof unit further has: an insertion portion at a distal end portion of which the image pickup device is provided; and an image processing unit that is provided at a proximal side of the insertion portion and that image-processes the digital signals being from the A/D converter.

12. The endoscope apparatus according to claim 1, wherein, if the maximum value of a resistance value for a current limiting resistors that limits the current value that is transmitted through the signal line by the digital signals is Rmax, a capacity value of a stray capacity of a transmission path by the signal line is Cs, and the transmission clock frequency that determines the transmission speed is the cutoff frequency fc, then the cutoff frequency fc is set so as to satisfy the equation $fc = 1/(2\pi \cdot Rmax \cdot Cs)$.

13. An endoscope apparatus configured for use in a potentially explosive environment, the endoscope comprising:

an explosion-proof unit that has an image pickup device that outputs photographed video images as video image signals; and an A/D converter that converts the video image signals into digitalized image signals;

a control unit that is configured to control the explosion-proof unit; and an energy limiting circuit configured for limiting electrical energy of digital signals to satisfy intrinsic safety when sending and receiving of the digital signals, wherein the explosion-proof unit is connected to the control unit via the energy limiting circuit with a signal line, and the energy limiting circuit limits a current value, which is transmitted through the signal line by the digital signals, to be the current value that satisfies the intrinsic safety, and limits a cutoff frequency to be a transmission clock frequency that determines a transmission speed of the digital signals, wherein the energy limiting circuit has a resistor that is inserted in series on the signal line, and wherein the resistor has a resistance value corresponding to a cutoff frequency that satisfies transmission speed between the control unit and the explosion-proof unit, and a resistance value sufficient to eliminate the digital signals as a factor in causing explosion in said potentially explosive environment.

* * * * *